(12) United States Patent
Zhang et al.

(10) Patent No.: US 9,959,099 B2
(45) Date of Patent: May 1, 2018

(54) FRAMEWORK FOR ON DEMAND FUNCTIONALITY

(71) Applicant: SAP SE, Walldorf (DE)

(72) Inventors: Wenli Zhang, San Jose, CA (US); Anil Samudrala, Newark, CA (US)

(73) Assignee: SAP SE, Walldorf (DE)

( * ) Notice: Subject to any disclaimer, the term of this patent is extended or adjusted under 35 U.S.C. 154(b) by 150 days.

(21) Appl. No.: 15/218,092

(22) Filed: Jul. 25, 2016

(65) Prior Publication Data
US 2018/0024818 A1    Jan. 25, 2018

(51) Int. Cl.
G06F 8/35 (2018.01)
G06F 8/36 (2018.01)
G06F 9/44 (2018.01)

(52) U.S. Cl.
CPC . G06F 8/35 (2013.01); G06F 8/36 (2013.01)

(58) Field of Classification Search
None
See application file for complete search history.

(56) References Cited

U.S. PATENT DOCUMENTS

| | | | | |
|---|---|---|---|---|
| 7,043,716 B2* | 5/2006 | Zimmer | ............. | G06F 8/30 715/234 |
| 7,076,762 B2* | 7/2006 | Fisher | ............. | G06F 8/20 717/102 |
| 7,316,000 B2* | 1/2008 | Poole | ............. | G06F 8/20 717/104 |
| 7,761,848 B1* | 7/2010 | Chaffin | ............. | G06F 8/20 717/106 |
| 8,209,688 B2* | 6/2012 | Martin | ............. | G06F 21/608 718/100 |
| 9,223,546 B1* | 12/2015 | Chaffin | ............. | G06F 8/20 |
| 2004/0044985 A1* | 3/2004 | Kompalli | ............. | G06F 8/20 717/100 |
| 2011/0209115 A1* | 8/2011 | Weil | ............. | G06F 8/71 717/103 |
| 2013/0205275 A1* | 8/2013 | Thomson | ............. | G06F 8/34 717/105 |
| 2015/0378743 A1* | 12/2015 | Zellermayer | ............. | G06F 9/4401 713/2 |
| 2016/0041815 A1* | 2/2016 | Bhagat | ............. | G06F 8/36 717/107 |
| 2016/0092176 A1* | 3/2016 | Straub | ............. | G06F 8/34 717/107 |
| 2016/0124722 A1* | 5/2016 | Mathew | ............. | G06F 8/40 717/136 |

* cited by examiner

*Primary Examiner* — Chat Do
*Assistant Examiner* — Douglas Slachta

(57) ABSTRACT

Methods and system are disclosed that instantiate an on demand functionality for a layer in a multilayered system. In one aspect, a framework integrated with the multilayered system may receive a request to create a root function. The root function may be associated with common functionalities or specific functionalities. Based on parameters associated with the layers and attributes associated with data flow paths between the layers, a layer to deploy the root function may be determined. Upon deploying the root function, sub functions may be created in the determined layer by the framework. The sub functions may be configured common functionalities or specific functionalities by the framework. A function model including the root function and the sub functions may be generated. The function model may be instantiated to provide an on demand functionality or an on demand application.

11 Claims, 9 Drawing Sheets

FRAMEWORK FOR ON DEMAND FUNCTIONALITY

BACKGROUND

Multi-tiered software applications may include multiple integrated components with distinct and unique functionalities. The functionalities associated with some of the components may not be reusable between different tiers of the software application. Moreover, the complexity of the software application increases with the number of tiers and non-reusable components. In such a scenario, the complexity of the multi-tiered software applications may be reduced by providing a framework for designing components with functionalities that may be reusable between the multiple tiers. However, providing such a framework that integrates with the multiple-tiers of the software application to design reusable components and provide on demand functionality, may be challenging.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Figure 1:
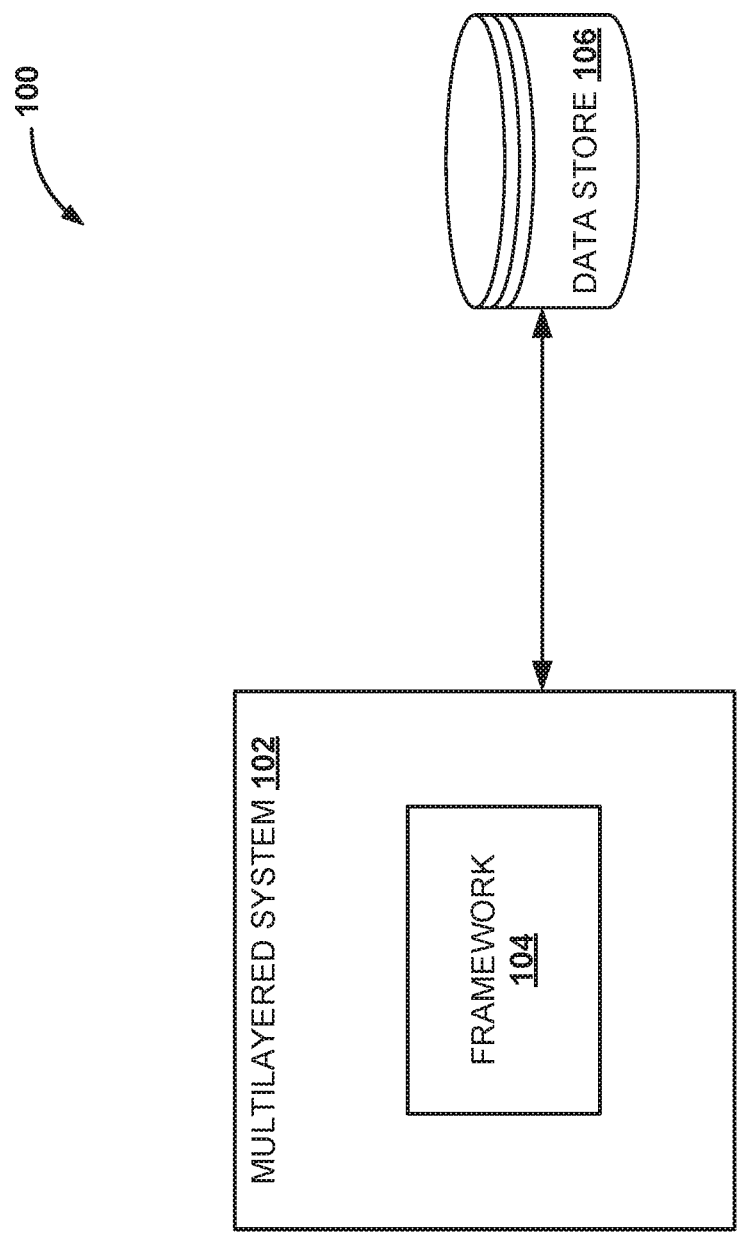
FIG. 1 is a block diagram illustrating environment to generate an on demand functionality for a layer in a multi-layered system, according to an embodiment.

Embodiments of techniques related to framework for on demand functionality are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Customized software applications may be designed and built using software development methodologies. The software applications may include multiple layers (e.g., front end, middleware, backend, etc.) and each layer may provide a platform for executing specific functionalities. Such functionalities may be packaged or bundled as software routines, software packages, software components, etc. In an embodiment, such software routines, software packages, software components, etc., may be integrated and may work in cooperation with each other.

A software component may correspond to set of instructions or program code that may be reused based on definition and implementation. A software routine or subroutine may include a sequence of code (e.g., set of instructions executable by a processor of the system or software application) that is intended to be called and used repeatedly during the execution of a program. The cooperation between the software components or software routines may provide a framework for designing software components with functionalities, instantiating function models, user interface engines, composing or creating functions, instantiating on demand functionalities, etc.

In an embodiment, the software application may work in cooperation with a framework that may be integrated and provide a platform for composing or creating functions. Such functions may provide specific functionalities or common functionalities and may be implemented as software components or software routines. In an embodiment, the functionalities (e.g., common functionalities or specific functionalities) may be reused between the multiple layers of the software application. Reusability of the software components may eliminate redundancy, thereby reducing the complexity of the software application. In an embodiment, the software application may render information on a user interface element by accessing data stored in a data store.

For example, the middleware may include routines for processing requests, accessing and retrieving data from the data store, etc. In an embodiment, the data may be stored in business objects residing the data store. A data store may correspond to an in-memory database, a web-based database, a conventional database, etc. The in-memory database may include a main memory and an underlying hardware for executing storage and computational operations. Typically, the data may be available in the main memory and operations such as, computations and memory-reads may be executed in the main memory.

FIG. 1 is a block diagram illustrating environment 100 to generate an on demand functionality for a layer in a multi-layered system, according to an embodiment. FIG. 1 shows a multilayered system 102 in communication with data store 106. In an embodiment, multilayered system 102 may include framework 104 integrated to work in cooperation with multiple layers of multilayered system 102. In an embodiment, framework 104 may provide a platform for defining or creating functions (e.g., root function, sub functions, etc.) that may be implemented as software routines or software components. The functions may be reused between the multiple layers based on business requirement or on demand to provide specific or common functionalities.

In an embodiment, data store 106 may store data associated with an enterprise in business objects. A business object may correspond to a data structure that may encapsulate, store, and provide an abstraction between function and the data. The data stored in the business objects may be accessed via data access mechanism by the multiple layers (e.g., via middleware) of multilayered system 102. In an embodiment, an on demand functionality for a layer in multilayered system 102 may be provided by instantiating a function model. The function model may be designed to include common functionalities or specific functionalities.

In an embodiment, the on demand functionality for the layer may be created by composing or creating a function that may be reused between the multiple layers. Framework 104 working in cooperation with the multiple layers of multilayered system 102 may be used to create or compose the functions. The functions may be implemented as executable software routines or software components. In an embodiment, framework 104 may receive a request to create a function (e.g., root function) that may be configured with common functionalities or specific functionalities. Each layer in multilayered system 102 may be associated with parameters that may be used to uniquely identify a layer. The data or information between the different layers or the functions (e.g., root function, sub functions, etc.) may flow via data flow paths. Each data path may be associated with multiple attributes.

In an embodiment, based on the parameters associated with the layers and attributes associated with data flow paths, functions (e.g., root function or sub functions) may be deployed in a layer of multilayered system 102. In an embodiment, framework 104 may provide configuring the root function or sub functions with specific functionalities based on multiple dimensions, such as the parameters associated with the layer, the attributes associated with the data flow paths, business requirement, etc. In an embodiment, upon configuring the root function or the sub functions with common functionalities or specific functionalities, a function model including the root function and the sub functions may be generated by framework 104. The function model may be instantiated to provide an on demand functionality.

Figure 2:
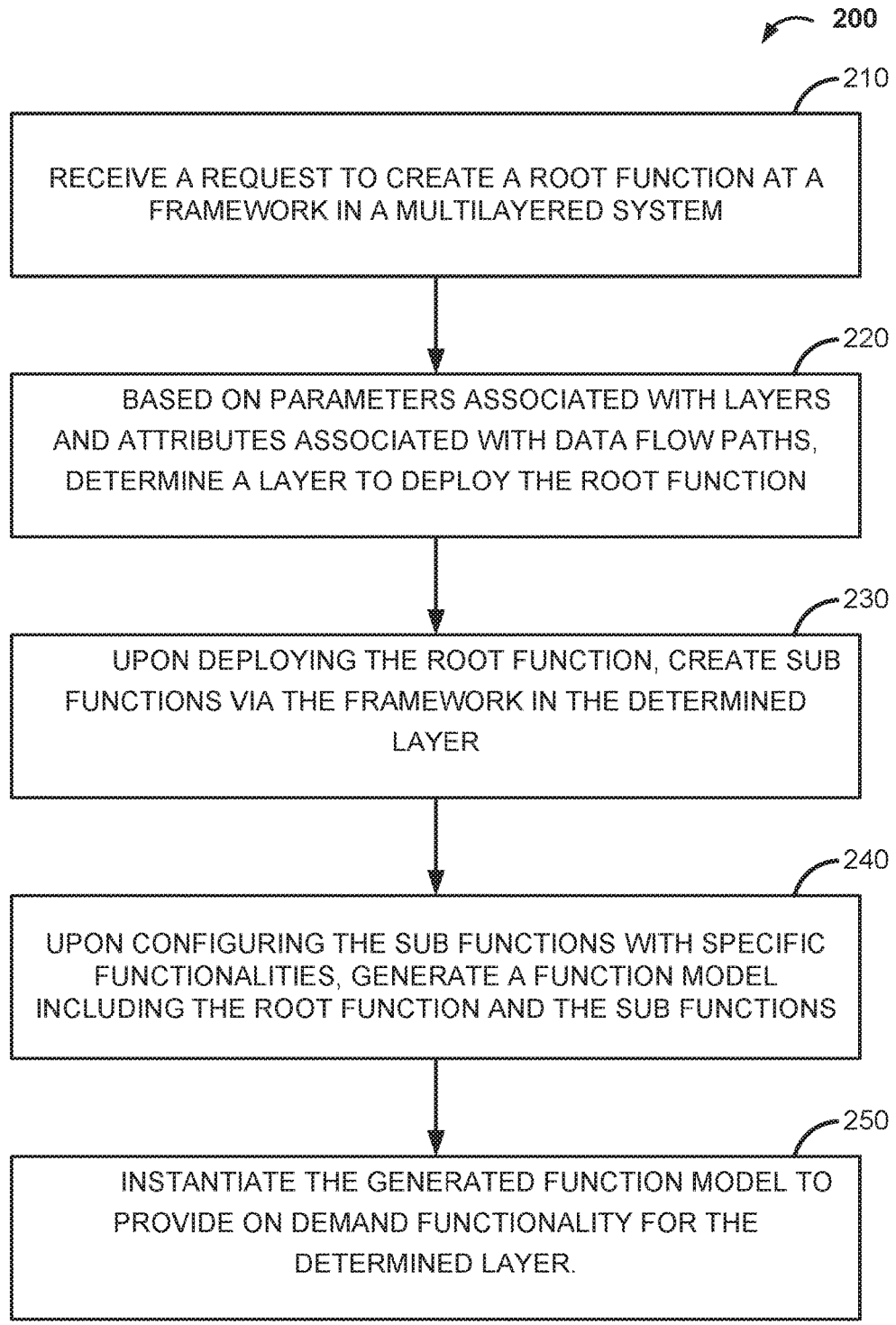
FIG. 2 is a flow diagram illustrating process to generate an on demand functionality for a layer in a multilayered system, according to an embodiment.

FIG. 2 is a flow diagram illustrating process 200 to generate an on demand functionality for a layer in a multilayered system, according to an embodiment. In an embodiment, an on demand functionality for a layer in a multilayered system may be provided by instantiating a function model. A framework for composing or defining functions (e.g., root functions, sub functions, etc.) may be provided. The framework may provide a platform for composing or defining functions (e.g., root function, sub functions, etc.) and deployed as software components or software routines in the multilayered system. The functions or sub functions defined or composed via the framework may be distributed composite multilayered functions that may be used to generate function models with on demand functionalities. The function models may be instantiated to provide on demand functionalities or on demand applications based on a business requirement. The framework may also provide a platform to configure the functions or sub functions with common functionalities or specific functionalities based on the layer in which the functions or sub functions are deployed. Such an ability to configure or reconfigure the functions or sub functions may provide reusability of the functions in different layers of the multilayered system.

In an embodiment, a request for creating a root function at a framework in a multilayered system is received, at 210. The root function may be configured with definitions and functionalities. For example, the root function may be configured with common functionalities (e.g., business functionalities to support business operations in the enterprise) in the multilayered system. The business functionalities may be operational processes that may be used to manage business activities in an enterprise or organization.

In an embodiment, each layer of the multilayered system may be associated with multiple parameters. The information or data between the layers or functions or sub functions may flow via data flow paths. The data flow paths may be associated attributes that may identify flow of information or data either between the multiple layers or functions (e.g., root function, sub functions, etc.). In an embodiment, based on the parameters associated with the layer and attributes associated with the data flow paths, the layer in which the root function is to be deployed is determined, at 220. The decision logic executing as a software routine (e.g., instructions executed by a processor in the multilayered system) in the framework may determine the layer in which the root function is deployed. Upon deploying the root function, sub functions may be created or defined via the framework in the determined layer, at 230.

In an embodiment, the framework may provide a platform for configuring the sub functions with definitions and specific functionalities. For example, the sub functions may be configured specific functionalities based on multiple dimensions, such as the parameters associated with the layers, the attributes associated with the data flow paths, business requirement, etc. Upon configuring the sub functions with specific functionalities, a function model including the root function and the sub functions is generated, at 240. In an embodiment, the generated function model including the functions (e.g., root function, sub functions) may provide an on demand functionality or may be used to build an on demand (e.g., user defined) application. The generated function model is instantiated to provide on demand functionality for the determined layer, at 250.

In an embodiment, the multilayered system may include multiple layers, such as a user interface layer, a controller layer, a model layer, a persistence layer, etc. The framework for composing or creating functions may be configured to work in cooperation with each layer (e.g., a user interface layer, a controller layer, a model layer, a persistence layer). In an embodiment, the user interface layer may also be referred to as view layer may render information to an end user via user interface elements, support functionalities, such as providing data fields to input values, receive request for specific operations, etc. The user interface elements including the functions at the user interface layer may be structured or arranged in multiple levels. Such an arrangement of the functions in multiple levels may provide abstraction between the functionalities (e.g., common functionalities, business functionalities, etc.).

In an embodiment, the abstraction between the functionalities may provide reusability of the functions between the different layers (e.g., user interface layer, controller layer, model layer, persistence layer, etc.) in the multilayered system. The framework may provide a mechanism for the functions (e.g., root function, sub functions, etc.) in the user interface layer to perform operations like add, delete, modify, etc. In an embodiment, the controller layer establishes a communication link between the user interface layer and the model layer. The controller layer may provide operations, such as receiving a request from the user interface layer, processing the received request, establishing communication with the model layer to retrieve data from business objects residing in the data store, etc. Upon receiving the request via the functions or user interface elements in the view layer, the controller layer process the request and map the request to retrieve specific information or data from the business objects. In an embodiment, the data retrieved from the business objects may be sent back to the view layer from the model layer.

In an embodiment, the controller layer may work in cooperation with a business object model to process the requests received from the user interface layer and retrieve data from the business objects. In an embodiment, the model layer may store data definitions, data relationships, mapping and configuration information between the layers, data stored in the business objects, etc. In an embodiment, the persistence layer may work in cooperation with business object model to persist information associated with the attributes of data in the business objects. For example, such attributes may correspond to information such as types, properties, references, etc., associated with the business objects. For example, the information persisted in the persistence layer may be used to process the requests from the user interface layer and retrieve information or data from the business objects. In an embodiment, based on the data definitions, the data relationships and attributes associated with the data flow paths between the layers in the multilayer system, the functions may be reused. For example, the reusability of the functions may be based on functionalities, business requirement, etc. Common functionalities may correspond to business functionalities and specific functionalities may correspond to technical functionalities.

Figure 3:
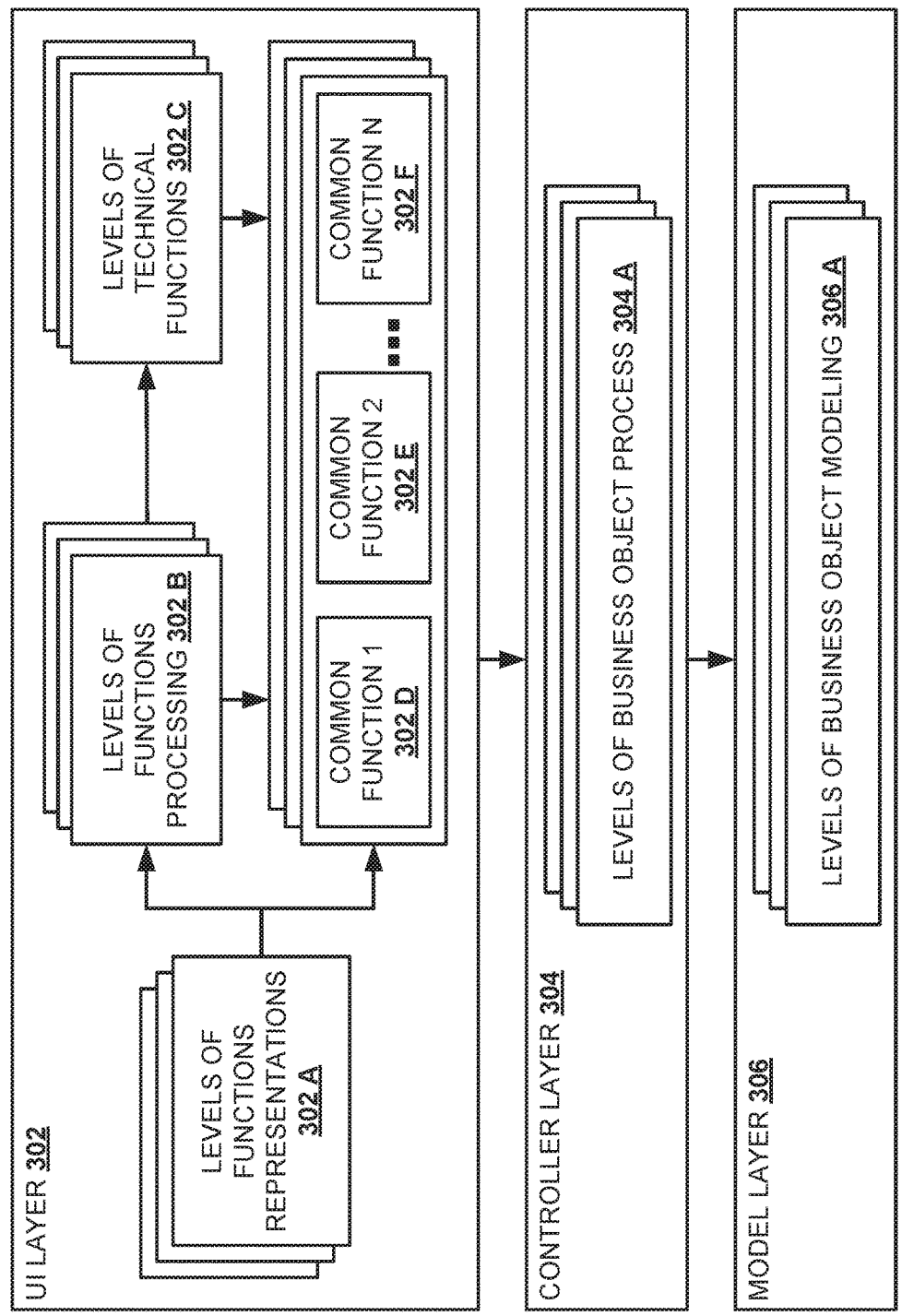
FIG. 3 is a block diagram illustrating an organization of layers in a multilayer system, according to an embodiment.

FIG. 3 is a block diagram illustrating an organization of layers in a multilayer system, according to an embodiment. In an embodiment, a multilayered system may include user interface (UI) layer 302, controller layer 304, model layer 306, persistence layer (not shown), etc. Each layer may include functions (e.g., root function, sub functions, etc.), implemented as software routines or software components and may provide common functionalities or specific functionalities. For example, the functions in user interface layer 302 may be arranged in multiple levels 302 A (e.g., structured in multiple layers) and may represent user interface elements. The user interface elements may be associated with common functionalities or specific functionalities, which may be processed by corresponding processing elements (e.g., multiple levels of function processing 302 B or processing elements) in the user interface layer. Each function may be processed by the corresponding processing element, thereby providing an abstraction between the functionalities. In an embodiment, the technical functions and common functions may be arranged in multiple levels (e.g., 302 C, 302 D, 302 E and 302 F) in the view layer.

In an embodiment, controller layer 304 may include business object processing that may be arranged in multiple levels (e.g., 304 A). The controller layer 304 may establish a communication between user interface layer 302 and model layer 306 and may provide operations, such as retrieving data from business objects in the data store, sending the data retrieved from model layer 302 to user interface layer 302, rendering the retrieved data on user interface elements in user interface layer 302, etc. In an embodiment, model layer 306 may include definitions and relationships related to business object model, that may be arranged in multiple levels (e.g., 306 A).

Figure 4:
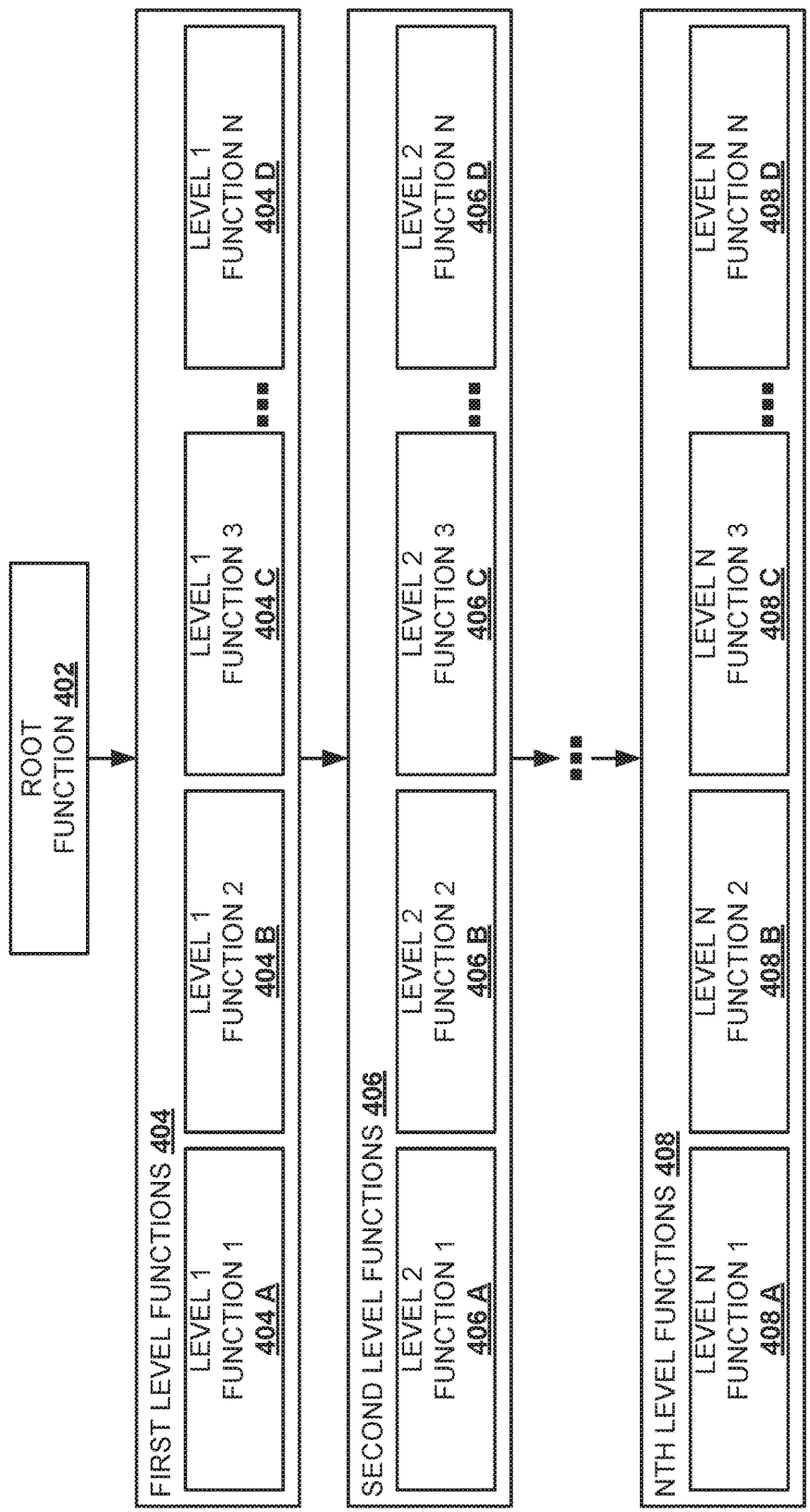
FIG. 4 is a block diagram illustrating composition of functions, according to an embodiment.

FIG. 4 is a block diagram illustrating composition of functions, according to an embodiment. In an embodiment, multiple levels of functions (e.g., first level functions 404, second level functions 406, . . . $n^{th}$ level functions 408, etc.) may be composed or created by the framework. A root function 402 including common functionalities may be defined or created by the framework. Based on parameters associated with the layers and attributes associated with the data flow paths, a determination to deploy the root function 402 in a specific layer may be made and root function 402 may be deployed in the determined layer of a multilayered system. Upon deploying the root function, sub functions in multiple levels (e.g., first level functions 404, second level functions 406, nth level functions 408) may be defined or created in that specific layer (e.g., in the layer in which the root function is deployed or other layers of the multilayered system). In an embodiment, the defined functions (e.g., root function 402, sub functions 404 A, 404 B, 404 C, 404 D, 406 A, 406 B, 406 C, 406 D, 408 A, 408 B, 408 C, 408 D, etc.) may be configured with common functionalities (e.g., related to business functionalities) or specific functionalities (e.g., technical functionalities). Such common functionalities and technical functionalities may be associated with specific business needs and may be reused in different layers of the multilayered system.

Figure 5:
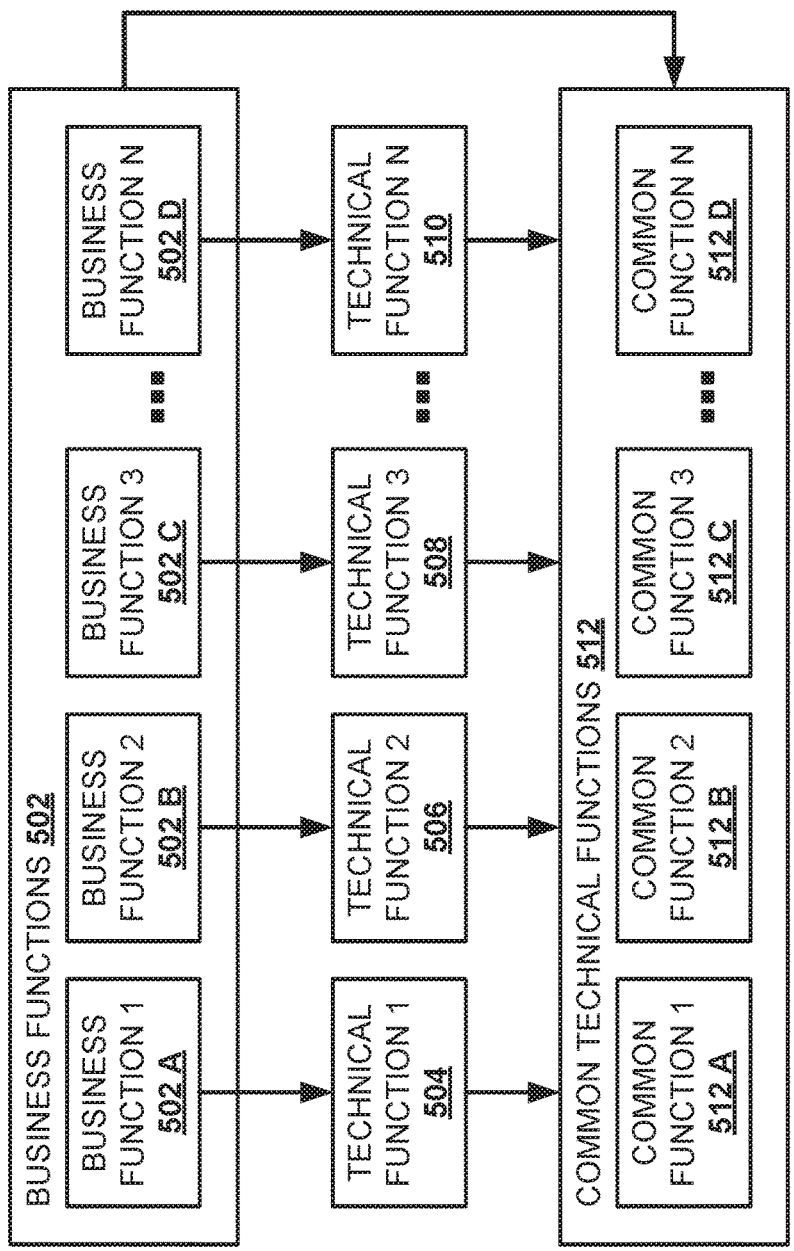
FIG. 5 is a block diagram illustrating composing functions with common technical functions by a framework, according to an embodiment.

FIG. 5 is a block diagram illustrating composing functions with common technical functions by a framework, according to an embodiment. In an embodiment, the framework may be used to compose or define common technical functions 512 which may include a combination of business functionalities (e.g., 502) and technical functionalities (e.g., 504, 506, 508, and 510). As exemplarily illustrated, the framework may provide a platform to compose or define 'common technical function 1' 512 A by combining functionalities of 'business function 1' 502 A (e.g., business functionalities) and 'technical function 1' 504 (e.g., technical functionalities). Similarly, other common technical functions (e.g., 512 B, 512 C, 512 D, etc.) may be composed by composed or defined by respectively combining functionalities associated with the business functions (e.g., 502 B, 502 C, 502 D, etc.) and the technical functions (e.g., 506, 508, 510, etc.).

Figure 6:
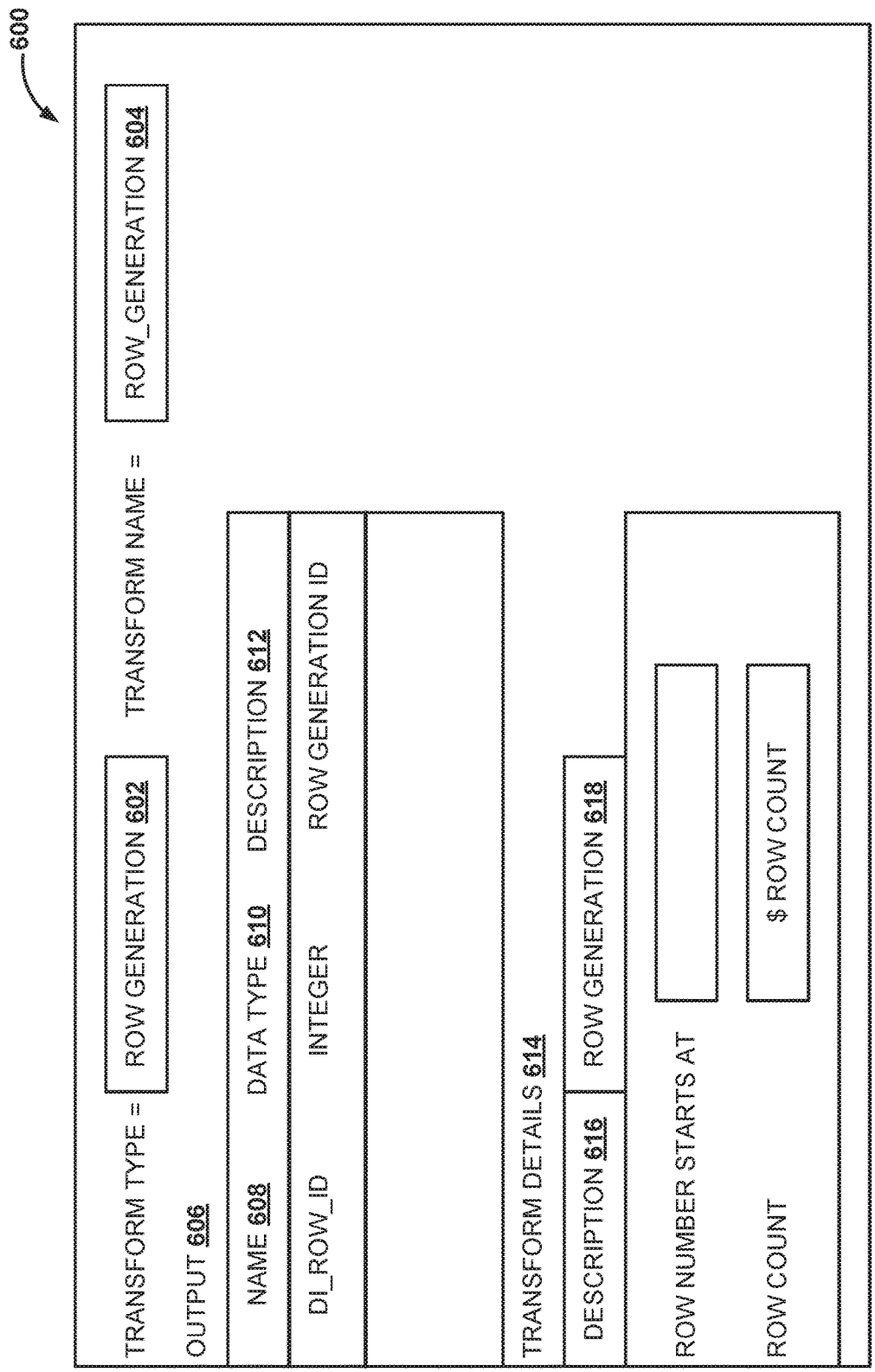
FIG. 6 is user interface associated with a functionality composed via a framework, according to an embodiment.

FIG. 6 is user interface 600 associated with a functionality composed via a framework, according to an embodiment. In an embodiment, user interface 600 including a functionality for generating rows for storing data may be defined or composed by the framework. Such user interface 600 may include attributes or identifiers, such as 'Transform Type: ROW GENERATION' 602, 'Transform Name: ROW_GENERATION' 604, etc. The attributes or identifiers grouped under 'OUTPUT' 606 may include 'NAME' 608, 'DATA TYPE' 610, 'DESCRIPTION' 612, etc. The above referenced attributes or identifiers may include values, such as, 'DI_ROW_ID', 'INTEGER', 'ROW GENERATION ID', etc. The 'TRANSFORM DETAILS' 614 may include user interface elements related to 'DESCRIPTION' 616, 'ROW GENERATION' 618, etc. In an embodiment, the function for generating rows may include attributes related to start number of rows, number of rows, for example, 'START NUMBER FOR THE ROW', 'ROW COUNT', as shown in FIG. 6. In an embodiment, the function for generating rows may be reused with other functions or transforms in the same layer of the multilayer system.

Figure 7:
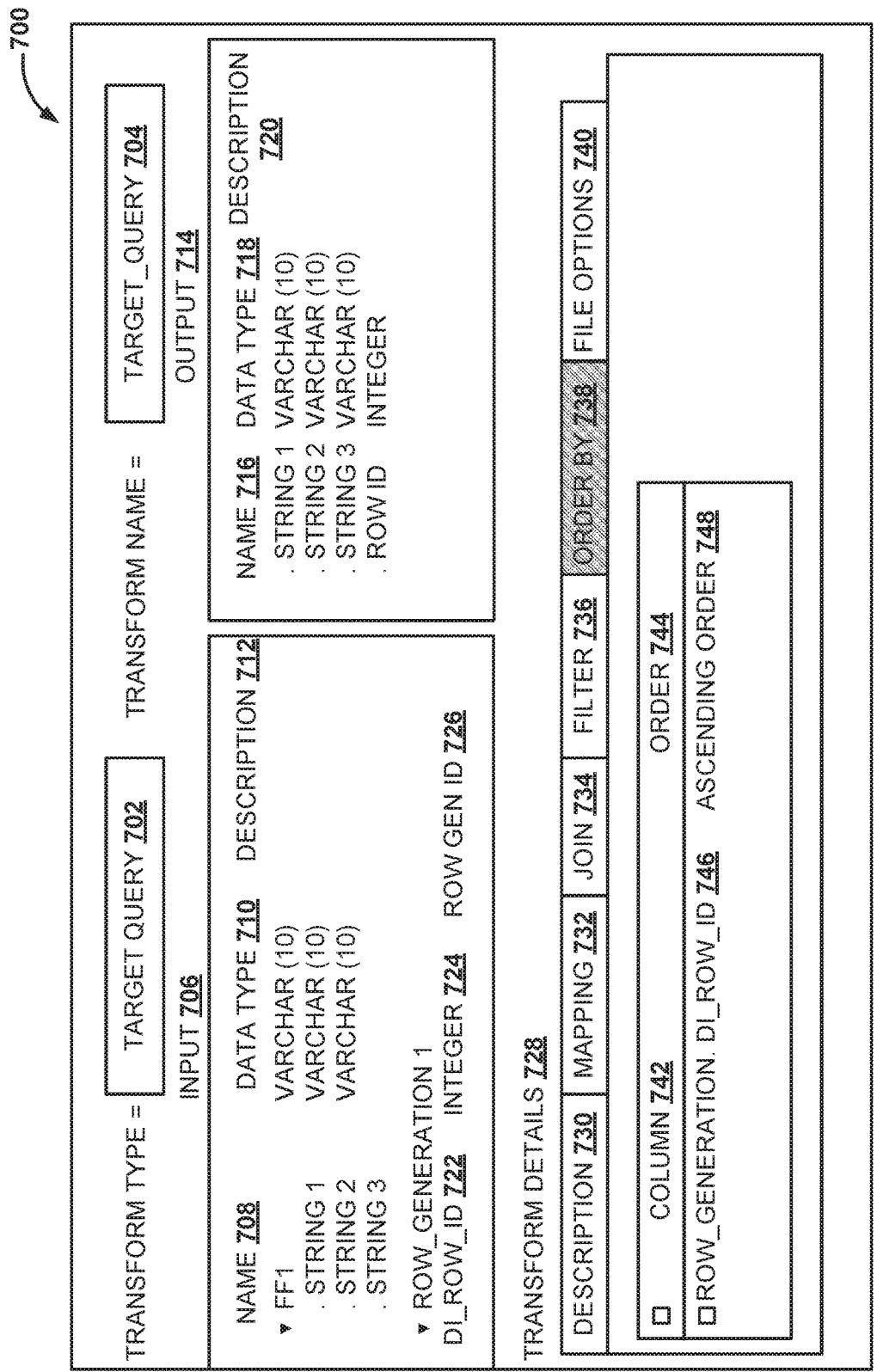
FIG. 7 is user interface associated with a functionality composed via a framework, according to an embodiment.

FIG. 7 is user interface 700 associated with a functionality composed via a framework, according to an embodiment. In an embodiment, user interface 700 including a functionality for generating target queries may be defined or composed by the framework. In an embodiment, user interface 700 associated with transforming the target query (e.g., 'Transform Type: Target Query' 702; 'Transform Name: Target_Query' 704) may include attributes, identifiers, functions that may be reused (e.g., function for generating rows from FIG. 6), etc. For example, attributes grouped under 'INPUT' 706 may include 'NAME' 708, 'DATA TYPE' 710, 'DESCRIPTION' 712, 'ROW_GENERATION_1' with values 'DI_ROW_ID' 722, 'INTEGER' 724. 'ROW GEN ID' 726, etc. The corresponding attributes grouped under 'OUTPUT' 714 may include 'NAME' 716, 'DATA TYPE' 718, 'DESCRIPTION' 720, etc.

In an embodiment, the function 'ROW_GENERATION_1' may correspond to the functionality for generating rows, as defined in FIG. 6. The functionality for generating rows may be reused in user interface 700 for transforming the target query. In an embodiment, the target query transformation may be reused with different data flow paths. FIG. 7 shows user interface 700 which includes 'TRANSFORM DETAILS' 728 with identifiers, attributes, functionalities such as 'DESCRIPTION' 730, 'MAPPING' 732, 'JOIN' 734, 'FILTER' 736, 'ORDER BY' 738, 'FILE OPTIONS' 740, etc. The user interface 700 also displays information, such as column 742, 'ROW_GENERATION.DI_ROW_ID' 746, 'ORDER' 744, 'ASCENDING ORDER' 748, etc. The transform details including functionalities, for example, 'DESCRIPTION' 730 may be reused in functions in the same layer (e.g., row generation transform or function of FIG. 6 may be reused in the same layer of the multilayer system). The functionalities, for example, 'JOIN' 734, 'FILTER' 736, 'ORDER BY' 738, etc., may be reused in the same layer of the multilayered system. The technical functionalities may be reused in other layers of the multilayered system depending on the business requirements.

Figure 8:
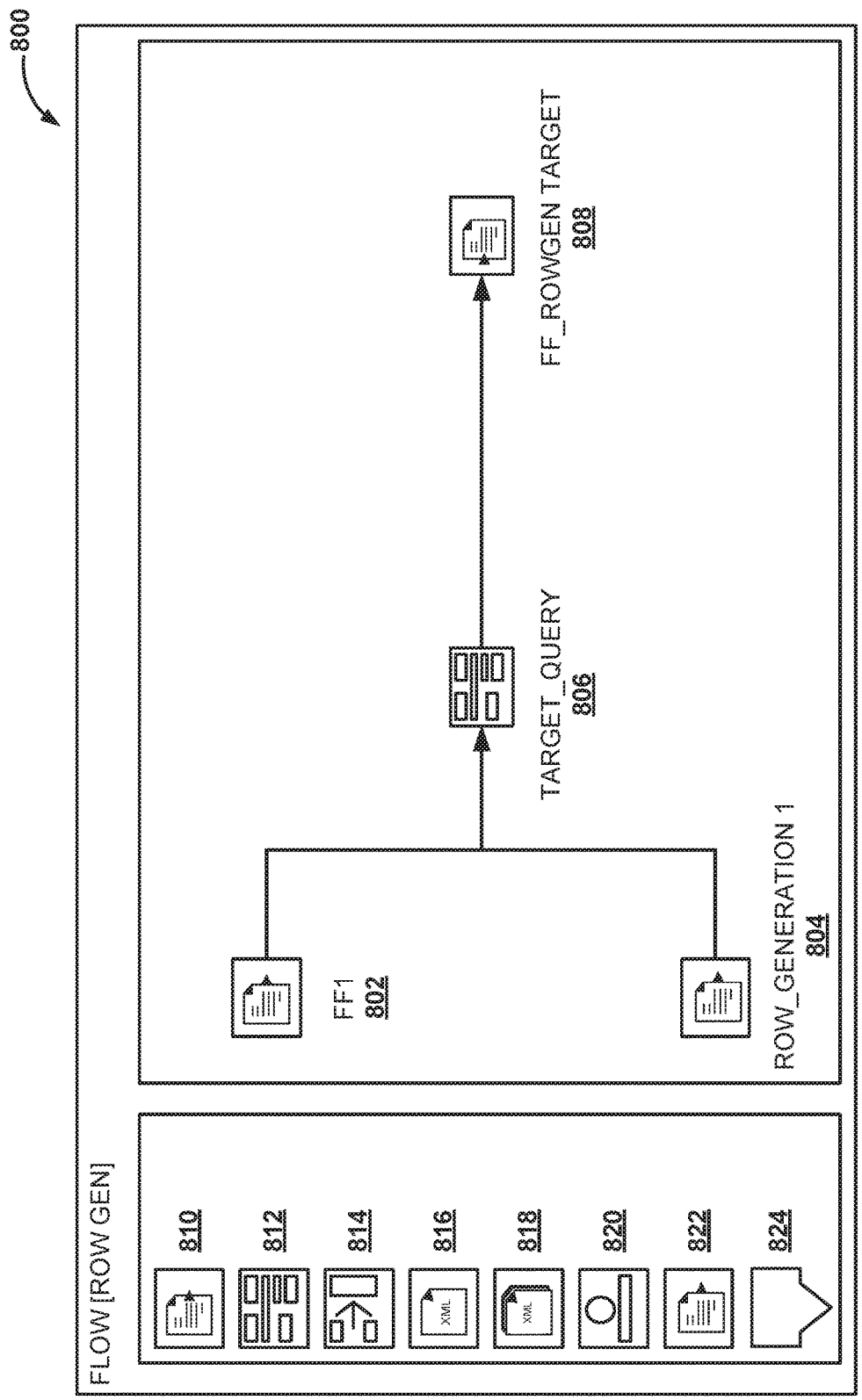
FIG. 8 is user interface associated with an application including functionalities defined via a framework, according to an embodiment.

FIG. 8 is user interface 800 associated with an application including functionalities defined via a framework, according to an embodiment. In an embodiment, the functions (e.g., represented as user interface elements) that may be composed or created via the framework may be used to instantiate an on demand functionality or an on demand application. For example, the functionalities composed via the framework, as described in FIG. 6 and FIG. 7 may be reused to create an on demand functionality. FIG. 8 shows creating an on demand functionality by reusing the functions (e.g., user interface elements). As exemplarily shown, the components including functions 802, 804, 806 and 808 may be connected by data flow path between the functions.

In an embodiment, upon connecting the functions with the data flow paths, a function model may be generated by the framework. The function model may be instantiated to provide an on demand functionality or an on demand application. In an embodiment, the on demand functionality may include common functionalities and/or specific functionalities (e.g., 810, 812, 814, 816, 818, 820, 822, 824, etc.) that may be dragged and dropped onto user interface 800 and may be connected via data flows. The reusability of the components (e.g., functionalities) provides generating or creating on demand functionalities or on demand applications depending on the business requirements.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a tangible computer readable storage medium. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 9:
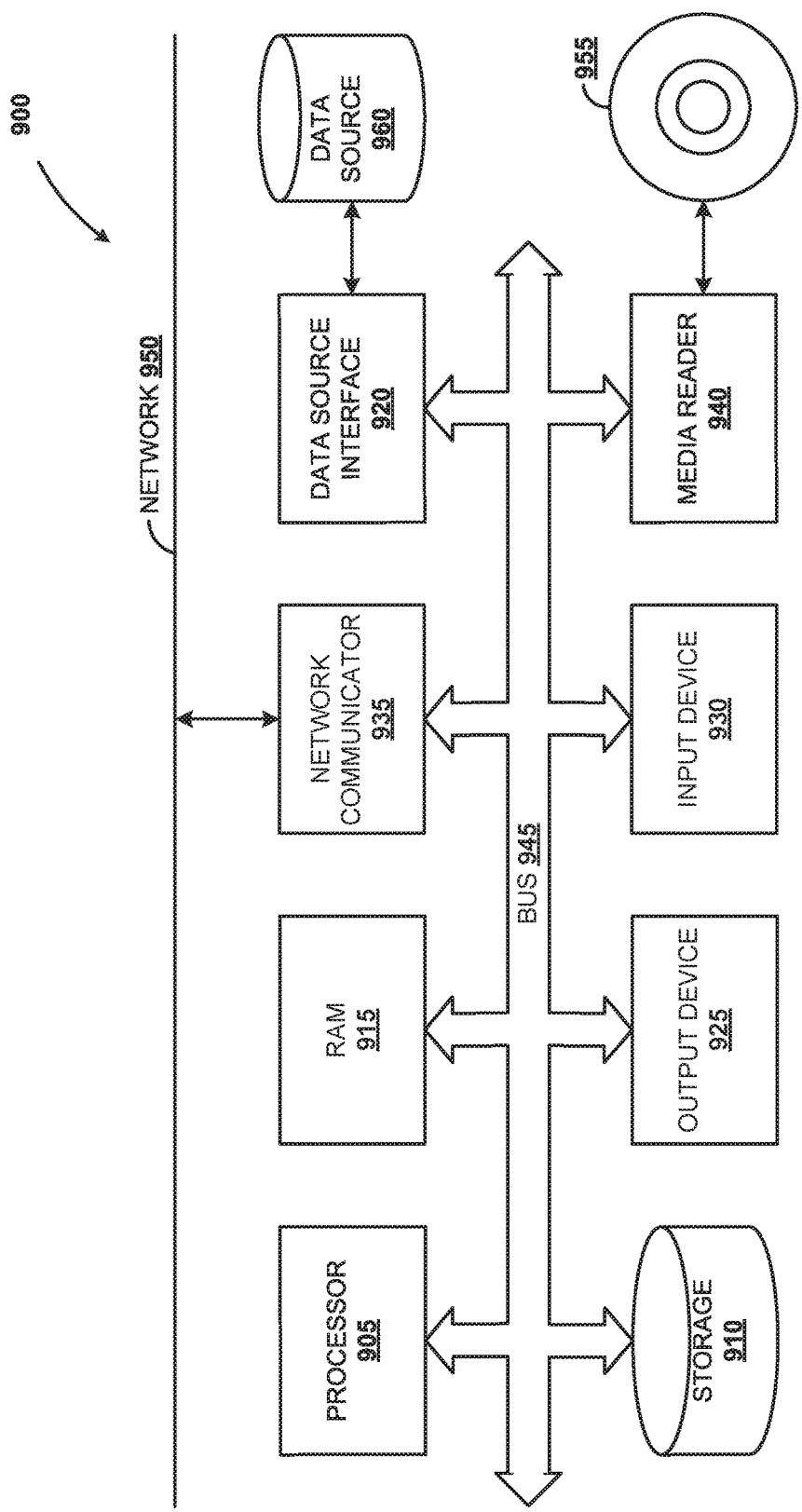
FIG. 9 is a block diagram of an exemplary computer system, according to an embodiment.

FIG. 9 is a block diagram of an exemplary computer system 900, according to an embodiment. Computer system 900 includes processor 905 that executes software instructions or code stored on computer readable storage medium 955 to perform the above-illustrated methods. For example, software instructions or code stored on computer readable storage medium 955 may correspond to the optimization algorithms, estimation algorithms, generate an optimum execution schedule, calculating processor idle times during the transformation of business data, determining whether to rearrange the transformation of business data in the tables between the processors, etc. Processor 905 can include a plurality of cores. Computer system 900 includes media reader 940 to read the instructions from computer readable storage medium 955 and store the instructions in storage 910 or in random access memory (RAM) 915. Storage 910 provides a large space for keeping static data where at least some instructions could be stored for later execution. According to some embodiments, such as some in-memory computing system embodiments, RAM 915 can have sufficient storage capacity to store much of the data required for processing in RAM 915 instead of in storage 910. In some embodiments, all of the data required for processing may be stored in RAM 915. The stored instructions may be further compiled to generate other representations of the instructions and dynamically stored in RAM 915. Processor 905 reads instructions from RAM 915 and performs actions as instructed. According to one embodiment, computer system 900 further includes output device 925 (e.g., a display) to provide at least some of the results of the execution as output including, but not limited to, visual information to users and input device 930 to provide a user or another device with means for entering data and/or otherwise interact with computer system 900. Each of these output devices 925 and input devices 930 could be joined by one or more additional peripherals to further expand the capabilities of computer system 900. Network communicator 935 may be provided to connect computer system 900 to network 950 and in turn to other devices connected to network 950 including other clients, servers, data stores, and interfaces, for instance. The modules of computer system 900 are interconnected via bus 945. Computer system 900 includes a data source interface 920 to access data source 960. Data source 960 can be accessed via one or more abstraction layers implemented in hardware or software. For example, data source 960 may be accessed by network 950. In some embodiments data source 960 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to instantiate an on demand functionality for a layer in a multilayered system, comprising:
    receiving, by a processor of a computer, a request to create a root function at a framework in a multilayered system, the root function associated with one or more common functionalities and one or more specific functionalities, wherein the multilayered system comprises a user interface layer, a controller layer and a model layer;
    based on one or more parameters associated with one or more layers and one or more attributes associated with data flow paths, determining, by the processor of the computer, a layer to deploy the root function;
    upon deploying the root function, creating, by the processor of the computer, one or more sub functions at the framework in the determined layer;
    upon configuring the one or more sub functions with one or more specific functionalities, generating, by the processor of the computer, a function model including the root function and the one or more sub functions;
    determining, by the processor of the computer, based on the data definitions, the data relationships and one or more data flow paths between the one or more layers in the multilayered system, whether the one or more common functionalities and the one or more specific functionalities are reusable in the one or more layers in the multilayered system; and
    instantiating, by the processor of the computer, the generated function model to provide on demand functionality for the determined layer, wherein at the user interface layer, the root function and the one or more sub functions are represented as user interface elements arranged in multiple layers to provide an abstraction between the one or more common functionalities and the one or more specific functionalities.

2. The computer implemented method of claim 1, wherein the controller layer establishes a communication between the user interface layer and the model layer, to:
    receive a request from the user interface layer;
    process the request and retrieve data from a data store in response to the received request via the model layer; and
    send the retrieved data to the user interface layer.

3. The computer implemented method of claim 1, wherein the model layer stores data definitions and data relationships associated with the one or more layers in the multilayered system in a plurality of business objects.

4. The computer implemented method of claim 1, wherein the one or more common functionalities correspond to one or more business functionalities and the one or more specific functionalities correspond to one or more technical functionalities in the multilayered system.

5. A computer system to instantiate an on demand functionality for a layer in a multilayered system, comprising:
    a memory storing computer instructions; and
    a processor communicatively coupled with the memory to execute the instructions to perform operations comprising:

receiving a request to create a root function at a framework in a multilayered system, the root function associated with one or more common functionalities and one or more specific functionalities, wherein the multilayered system comprises a user interface layer, a controller layer and a model layer;

based on one or more parameters associated with one or more layers and one or more attributes associated with data flow paths, determining a layer to deploy the root function;

upon deploying the root function, creating one or more sub functions at the framework in the determined layer;

upon configuring the one or more sub functions with one or more specific functionalities, generating function model including the root function and the one or more sub functions;

determining, based on the data definitions, the data relationships and one or more data flow paths between the one or more layers in the multilayered system, whether the one or more common functionalities and the one or more specific functionalities are reusable in the one or more layers in the multilayered system; and instantiating the generated function model to provide on demand functionality for the determined layer, wherein at the user interface layer, the root function and the one or more sub functions are represented as user interface elements arranged in multiple layers to provide an abstraction between the one or more common functionalities and the one or more specific functionalities.

6. The computer system of claim 5, wherein the controller layer establishes a communication between the user interface layer and the model layer, to:

receive a request from the user interface layer;

process the request and retrieve data from a data store in response to the received request via the model layer; and send the retrieved data to the user interface layer.

7. The computer system of claim 5, wherein the model layer stores data definitions and data relationships associated with the one or more layers in the multilayered system in a plurality of business objects.

8. The computer system of claim 5, wherein the one or more common functionalities correspond to one or more business functionalities and the one or more specific functionalities correspond to one or more technical functionalities in the multilayered system.

9. A non-transitory computer readable storage medium tangibly storing instructions, which when executed by a computer, cause the computer to execute operations comprising:

receive a request to create a root function at a framework in a multilayered system, the root function associated with one or more common functionalities and one or more specific functionalities, wherein the multilayered system comprises a user interface layer, a controller layer and a model layer;

based on one or more parameters associated with one or more layers and one or more attributes associated with data flow paths, determine a layer to deploy the root function;

upon deploying the root function, create one or more sub functions at the framework in the determined layer;

upon configuring the one or more sub functions with one or more specific functionalities, generate function model including the root function and the one or more sub functions;

determine, based on the data definitions, the data relationships and one or more data flow paths between the one or more layers in the multilayered system, whether the one or more common functionalities and the one or more specific functionalities are reusable in the one or more layers in the multilayered system; and instantiate the generated function model to provide on demand functionality for the determined layer, wherein at the user interface layer, the root function and the one or more sub functions are represented as user interface elements arranged in multiple layers to provide an abstraction between the one or more common functionalities and the one or more specific functionalities.

10. The non-transitory computer readable storage medium of claim 9, wherein the controller layer establishes a communication between the user interface layer and the model layer, to:

receive a request from the user interface layer;

process the request and retrieve data from a data store in response to the received request via the model layer; and send the retrieved data to the user interface layer.

11. The non-transitory computer readable storage medium of claim 9, wherein the model layer stores data definitions and data relationships associated with the one or more layers in the multilayered system in a plurality of business objects.

* * * * *